(12) United States Patent
Kimura

(10) Patent No.: US 7,284,584 B2
(45) Date of Patent: Oct. 23, 2007

(54) LATERALLY INSTALLING WHEEL

(75) Inventor: Yoshiaki Kimura, Toyota (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/297,323

(22) Filed: Dec. 9, 2005

(65) Prior Publication Data

US 2006/0086447 A1  Apr. 27, 2006

Related U.S. Application Data

(63) Continuation of application No. PCT/JP2003/009982, filed on Aug. 6, 2003.

(30) Foreign Application Priority Data

Jun. 11, 2003  (JP) ............................. 2003-166489

(51) Int. Cl.
*B60B 25/16* (2006.01)
(52) U.S. Cl. .................. 152/412; 152/396; 152/409; 301/23; 301/35.2
(58) Field of Classification Search ............... 301/10.1, 301/64.5, 23, 24, 35.2; 152/396, 397, 398, 152/409, 410, 411, 412, 413, 408
See application file for complete search history.

(56) References Cited

U.S. PATENT DOCUMENTS

| | | | | | |
|---|---|---|---|---|---|
| 1,516,018 A | * | 11/1924 | Kitchell | ........................ | 301/23 |
| 1,710,614 A | * | 4/1929 | Furrer | ........................ | 152/412 |
| 1,936,745 A | * | 11/1933 | Areson | ........................ | 152/406 |
| 2,427,634 A | * | 9/1947 | Temple | ........................ | 152/409 |
| 2,496,256 A | * | 2/1950 | Babin | ........................ | 152/412 |
| 2,636,535 A | * | 4/1953 | Gaquinto | ........................ | 152/412 |
| 2,675,048 A | * | 4/1954 | Ebert | ........................ | 152/412 |
| 3,063,488 A | * | 11/1962 | Bennett et al. | ........................ | 152/10 |
| 3,494,404 A | * | 2/1970 | Parr | ........................ | 152/409 |
| 4,003,421 A | * | 1/1977 | Lejeune | ........................ | 152/409 |
| 4,165,777 A | * | 8/1979 | Sano | ........................ | 152/411 |
| 4,175,606 A | | 11/1979 | Bailey | | |
| 4,512,382 A | * | 4/1985 | Gibson | ........................ | 152/408 |
| 4,574,859 A | * | 3/1986 | Smith | ........................ | 152/410 |
| 4,706,723 A | * | 11/1987 | Loeber et al. | ........................ | 152/410 |
| 5,259,430 A | | 11/1993 | Smith et al. | | |
| 6,796,345 B2 | * | 9/2004 | Kimura | ........................ | 152/156 |

FOREIGN PATENT DOCUMENTS

| | | | |
|---|---|---|---|
| GB | 2223989 | * | 4/1990 |
| JP | 55-28578 | | 8/1953 |
| JP | 46-101 A | | 7/1971 |
| JP | 56-47302 A | | 4/1981 |

(Continued)

*Primary Examiner*—Russell D. Stormer
(74) *Attorney, Agent, or Firm*—DLA Piper US LLP

(57) ABSTRACT

A laterally installing wheel including a rim in which a rim main portion and a side ring are disconnectably coupled to each other at a coupling portion of the rim main portion and the side ring, wherein the coupling portion is constructed such that a gap between the rim main portion and the side ring is inconspicuous from outside in the axial direction of the wheel. The coupling portion is provided at an axially inner portion of the rim. In a case where the coupling portion is provided at an axially outer portion of the rim, the coupling portion is located at an inconspicuous portion.

7 Claims, 6 Drawing Sheets

FOREIGN PATENT DOCUMENTS

| | | | |
|---|---|---|---|
| JP | 57-158102 | * | 9/1982 |
| JP | 63-28702 A | | 2/1988 |
| JP | 2-182507 | | 7/1990 |
| JP | 2001-239801 | | 4/2001 |
| JP | 2001-191702 | | 7/2001 |
| JP | 2001-277805 | | 10/2001 |

* cited by examiner

LATERALLY INSTALLING WHEEL

This application is a continuation of International Application No. PCT/JP2003/009982, filed Aug. 6, 2003, which in turn, claims priority from Japanese Patent Application JP2003-166489, filed Jun. 11, 2003, the entire contents of which are incorporated herein by reference.

FIELD OF THE INVENTION

The present invention relates to a laterally installing wheel having a good external appearance by designing the wheel such that a gap between a side ring and a rim main portion and a step at a coupling portion of the side ring with the rim main portion are hard to be viewed from outside.

BACKGROUND OF THE INVENTION

A laterally installing wheel having a rim in which a rim main portion and a side ring are detachably coupled to each other at a coupling portion thereof is proposed by the present applicant (Japanese Patent Publication 2001-239801). In the laterally installing wheel, a tire is laterally installed (i.e. in the axial direction of the wheel) on the rim when the side ring is detached from the rim main portion, and then the side ring is inserted onto the rim main portion and is fixed to the rim main portion by rotating the side ring about the axis of the side ring.

However, with the conventional laterally installing wheel, when viewed from outside in the axial direction of the wheel, the external appearance of the wheel needs improvement because a gap between the side ring and the rim main portion and a step at the coupling portion of the side ring with the rim main portion are visible.

SUMMARY

An object of the invention is to provide a laterally installing wheel capable of providing an improved external appearance of the wheel when viewed from outside in the axial direction of the wheel.

A laterally installing wheel according to the present invention that achieves the above object is as follows:

(1) A laterally installing wheel including a rim where a rim main portion and a side ring are disconnectably coupled to each other at a coupling portion of the rim main portion and the side ring, wherein the coupling portion is constructed such that a gap between the rim main portion and the side ring is not visible or is difficult to view from outside in the axial direction of the wheel.

(2) A laterally installing wheel according to item (1) above, wherein the coupling portion is provided in an axially inner portion of the rim.

(3) A laterally installing wheel according to item (1) above, wherein the coupling portion is provided in an axially outer portion of the rim.

(4) A laterally installing wheel according to item (3) above, wherein the wheel is a wheel of a first type (hereinafter, type A) in which a tire bead on the side contacting the side ring is installed onto the rim main portion.

(5) A laterally installing wheel according to item (4) above, wherein a radially inner portion of the side ring is extended toward a disk and has a length such that an end of the radially inner portion is connected to a general surface of the disk.

(6) A laterally installing wheel according to item (4) above, wherein a radially inner portion of the side ring is extended toward a disk and has a length such that an end of the radially inner portion is butted to a surface of the disk.

(7) A laterally installing wheel according to item (4) above, wherein an outside surface of a rim bead seat at the side of the rim where the side ring is installed is machined by 0.5-2 mm in radius from an outside diameter reference line of an axially opposite rim bead seat.

(8) A laterally installing wheel according to item (3) above, wherein the wheel is a wheel of a second type (hereinafter, type B) in which a tire bead on the side contacting the side ring is installed onto the side ring.

(9) A laterally installing wheel according to item (8) above, wherein contact surfaces of the rim main portion and the side ring are directed in a horizontal direction.

(10) A laterally installing wheel according to item (9) above, wherein a surface of a disk and a back surface of the side ring intersect each other at an angle and an end of the contact surfaces of the rim main portion and the side ring is positioned at a boundary between the surface of a disk and the back surface of the side ring.

(11) A laterally installing wheel according to item (8) above, wherein at a coupling portion between the rim main portion and the side ring, two vertical load support portions are provided in an axial direction of the wheel.

(12) A laterally installing wheel according to item (8) above, wherein in one of the rim main portion and the side ring, a seal ring groove for fitting a seal ring therein is formed, and in the other of the rim main portion and the side ring, an undercut is formed so that in a position where the side ring is rotated the seal ring does not contact the other of the rim main portion and the side ring.

With the wheel described above, the following technical advantages are obtained:

With the wheel according to items (1) - (12) above, since the coupling portion is constructed such that a gap between the rim main portion and the side ring is not visible or is difficult to be viewed from outside in the axial direction of the wheel, the appearance of the wheel is improved.

With the wheel according to item (2) above, since the coupling portion is provided in an axially inner portion of the rim, the gap between the rim main portion and the side ring and a step at a coupling portion between the rim main portion and the side ring are not visible from outside in the axial direction of the wheel, so that the appearance of the wheel can be made good.

With the wheel according to items (3) - (12) above, since the gap between the rim main portion and the side ring is provided at an inconspicuous portion of the wheel or in an inconspicuous manner, irrespective of the type A or type B, the gap is difficult to view from outside in the axial direction of the wheel, so that the appearance of the wheel is improved.

BRIEF DESCRIPTION OF THE DRAWINGS

Embodiments of the present invention will now be explained with reference to the accompanying drawings, in which.

DETAILED DESCRIPTION OF EMBODIMENTS OF THE INVENTION

Figure 9:
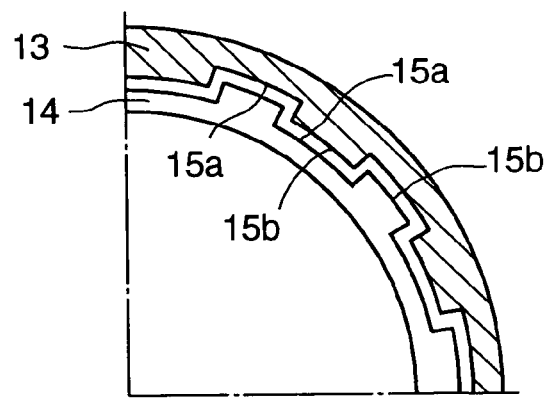
FIG. 9 is a front elevational view of the side ring and the rim main portion of a laterally installing wheel according to the present invention, illustrating a relationship between a protrusion and a concave groove of a coupling portion when the side ring is inserted to the rim main portion.
Figure 10:
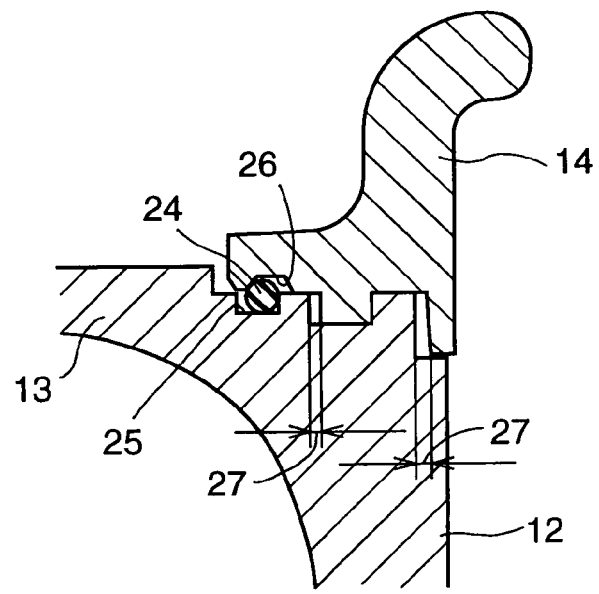
FIG. 10 is a cross-sectional view of a laterally installing wheel according to the present invention, in a case where the wheel is of type B, and where an undercut is formed at a seal ring installing position of the coupling portion.
Figure 11:
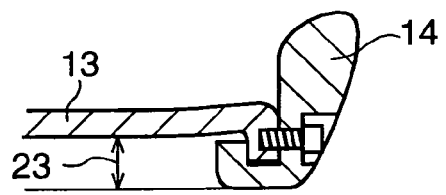
FIG. 11 is a cross-sectional view of a comparative laterally installing wheel illustrating a step at a coupling portion between a side ring and rim main portion.
Figure 12:
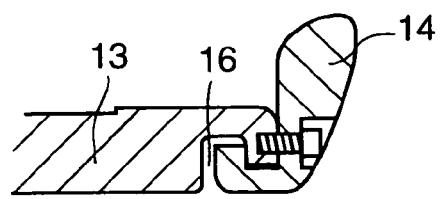
FIG. 12 is a cross-sectional view of a comparative laterally installing wheel illustrating a gap at a coupling portion between a side ring and rim main portion.

A laterally installing wheel according to the present invention will be explained with reference to FIGS. 1-12, wherein FIGS. 11 and 12 are comparative.

First, terms will be defined:

A laterally installing wheel is a wheel in which a side ring is detachably installed onto a rim main portion and in which a tire can be installed laterally to the wheel.

A side ring is a member independent of the rim main portion, and is installed onto the rim main portion after a tire has been installed onto the rim.

A coupling portion is a portion where the rim main portion and the side ring are coupled.

Type A is a wheel-type where a tire bead on the side contacting the side ring is installed onto a rim bead seat of the rim main portion.

Type B is a wheel-type where a tire bead on the side contacting the side ring is installed onto the side ring.

An axially outer portion of a rim is an outer portion of the rim in a right-and-left direction of a vehicle when the rim is mounted on the vehicle.

An axially inner portion of a rim is an inner portion of the rim in a right-and-left direction of a vehicle when the rim is mounted on the vehicle.

As illustrated in FIGS. 1-10, a laterally installing wheel 10 according to the present invention includes a rim 11 and a disk 12. The rim 11 includes a rim main portion 13 and a side ring 14 which is a member independent of the rim main portion 13. The rim main portion 13 and the side ring 14 are detachably coupled to each other at a coupling portion 15.

A tire and a run-flat core are installed to the rim laterally (i.e. in the axial direction of the wheel) when the side ring 14 is detached from the rim main portion 13. After installation, the side ring 14 is coupled to the rim main portion 13 at the coupling portion 15. As illustrated in FIG. 9, each of the side ring 14 and the rim main portion 13 has grooves 15a and protrusions 15b at the coupling portion 15. When the grooves 15a of the rim main portion 13 and the protrusions 15b of the side ring 14 axially coincide with each other, the side ring 14 is inserted onto the rim main portion 13 in the axial direction of the rim. After insertion, the side ring 14 is rotated so that the protrusions 15a of the rim main portion 13 and the protrusions 15b of the side ring 14 engage with each other in the axial direction of the rim whereby the side ring 14 cannot be removed from the rim main portion in the axial direction of the rim.

In type A, a seal ring 24 is provided in a corner between the side ring 14 to the rim main portion 13 and the tire bead, and is pressed by the tire bead when an air pressure is applied to the tire. In type B, the seal ring 24 is provided between the side ring 14 and the rim main portion 13.

Irrespective of type A or type B, the structure of the coupling portion 15 is such that a gap 16 between the rim main portion 13 and the side ring 14 is not visible or is hardly visible from outside the wheel in the axial direction of the wheel.

As a structure for making the gap 16 between the rim main portion 13 and the side ring 14 invisible from outside the wheel in the axial direction of the wheel, there are the following (i) and (ii).

(i) A structure in which the coupling portion 15 is located at an axially inner portion of the rim (an inner portion of the wheel in the right-and-left direction of the wheel). In the structure, the coupling portion 15 which is located at the axially inner portion of the rim cannot be viewed from axially outside the wheel, being obstructed by the disk 12.

(ii) A structure in which the coupling portion 15 is located at an axially outer portion of the rim (an outer portion of the wheel in the right-and-left direction of the wheel). In the structure, a surface of the side ring 14 is smoothly connected to a surface of the rim main portion 13 or is connected to a surface of the disk 12 at a portion of the wheel where a gap 16 is inconspicuous (for example, a corner). Though the coupling portion 15 is visible from axially outside of the wheel, the gap 16 is not conspicuous. A step of the conventional wheel is removed.

Figure 1:
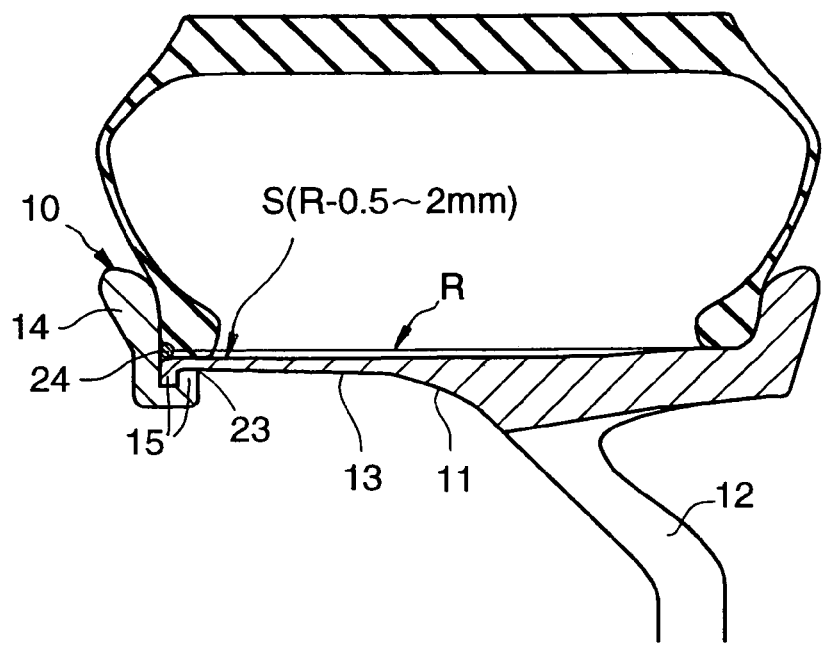
FIG. 1 is a cross-sectional view of a laterally installing wheel according to the present invention, in a case where the wheel is of type A and where a coupling portion between the side ring and the rim main portion is positioned at an axially inner portion of the rim.
Figure 2:
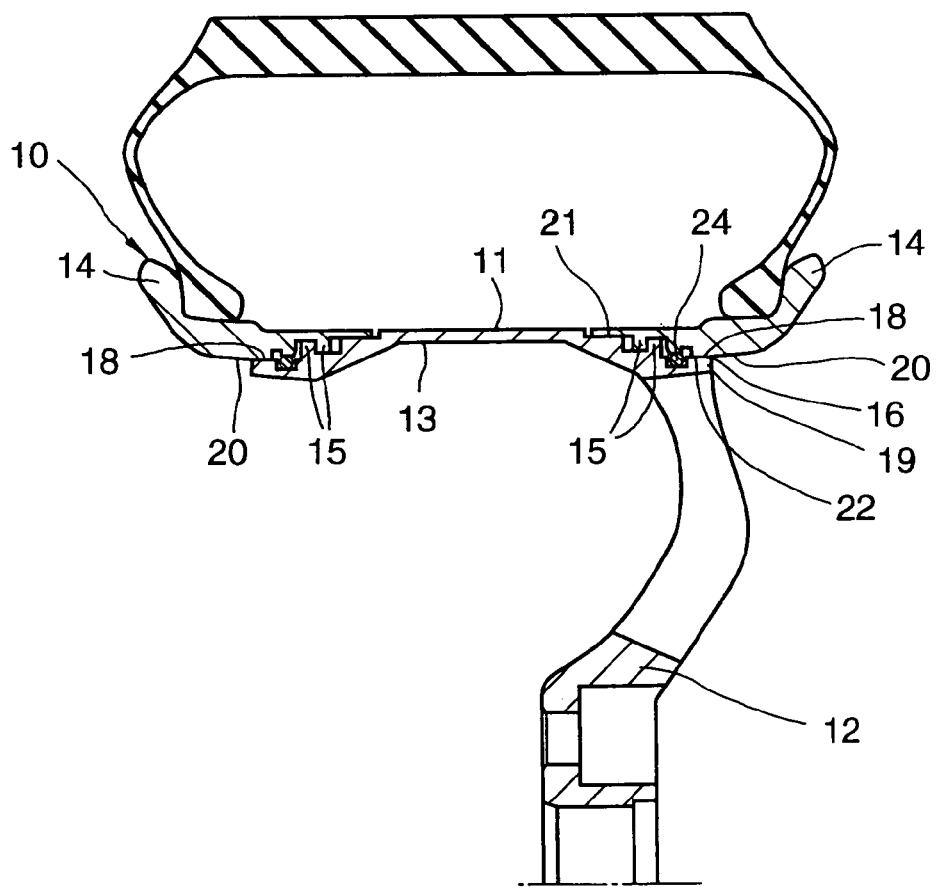
FIG. 2 is a cross-sectional view of a laterally installing wheel according to the present invention, in a case where the wheel is of type B and where a coupling portion between the side ring and the rim main portion is positioned at each of an axially inner portion of the rim and an axially outer portion of the rim.

A case where the structure of item (i) above is provided at an axially inner portion of the rim and is embodied in the wheel of type A is shown in FIG. 1, and a case where the structure of item (i) above is embodied in the wheel of type B is shown in FIG. 2.

In the wheel 10 of type A shown in FIG. 1, the coupling portion 15 is provided at an axially inner portion of the rim. A step 23 may remain.

In the wheel 10 of type B shown in FIG. 2, the coupling portion 15 is provided at each of an axially inner portion and an axially outer portion of the rim. The coupling portion 15 provided at the axially inner portion of the rim cannot be viewed, being obstructed by the disk 12.

Figure 5:
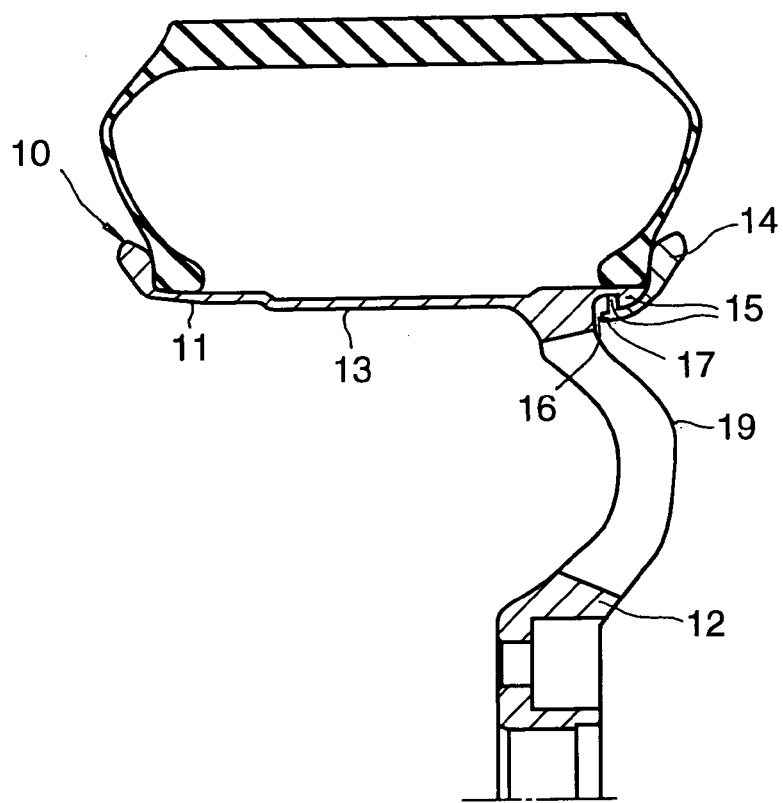
FIG. 5 is a cross-sectional view of a laterally installing wheel according to the present invention, in a case where the wheel is of type A, where the coupling portion is positioned at an axially outer portion of the rim, and where an extending portion of the side ring extending toward a disk is short and an end of the extending portion is substantially butted to a disk surface.
Figure 6:
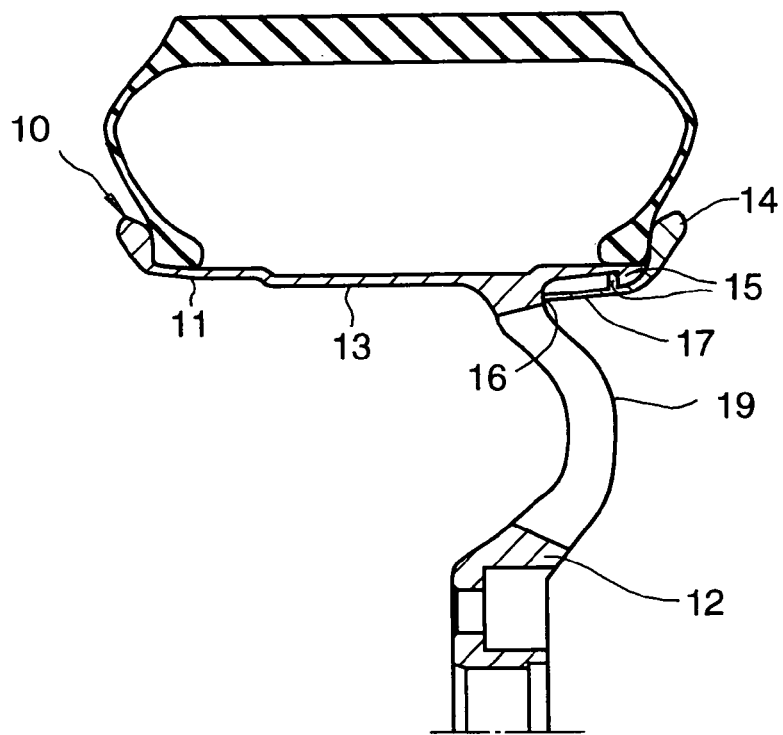
FIG. 6 is a cross-sectional view of a laterally installing wheel according to the present invention, in a case where the wheel is of type A, where the coupling portion is positioned at an axially outer portion of the rim, and where an extending portion of the side ring extending toward a disk is long and an end of the extending portion substantially butts to a disk surface.
Figure 7:
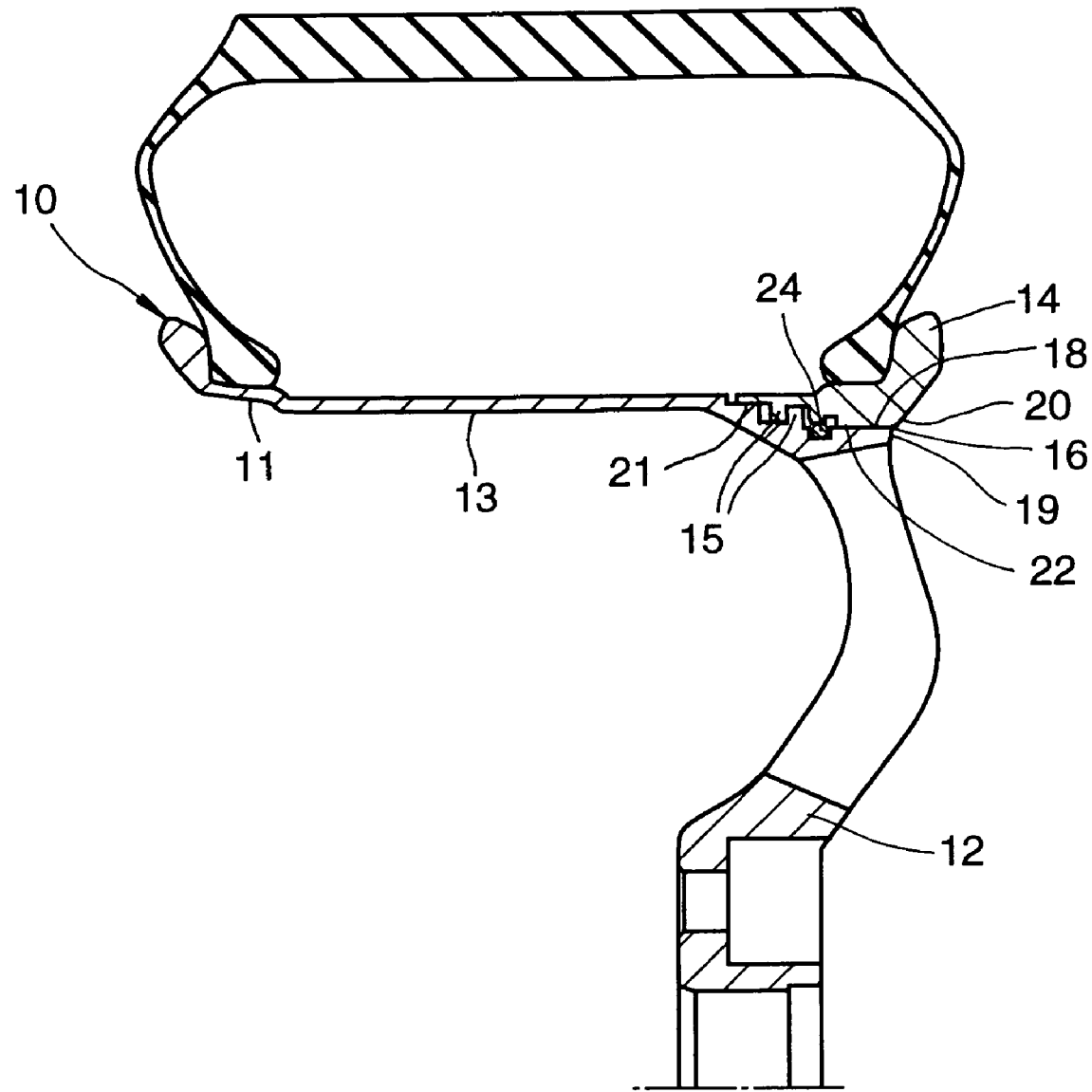
FIG. 7 is a cross-sectional view of a laterally installing wheel according to the present invention, in a case where the wheel is of type B, where the coupling portion is positioned at an axially outer portion of the rim, and where contact surfaces of the side ring and the rim main portion are directed in a horizontal direction.
Figure 8:
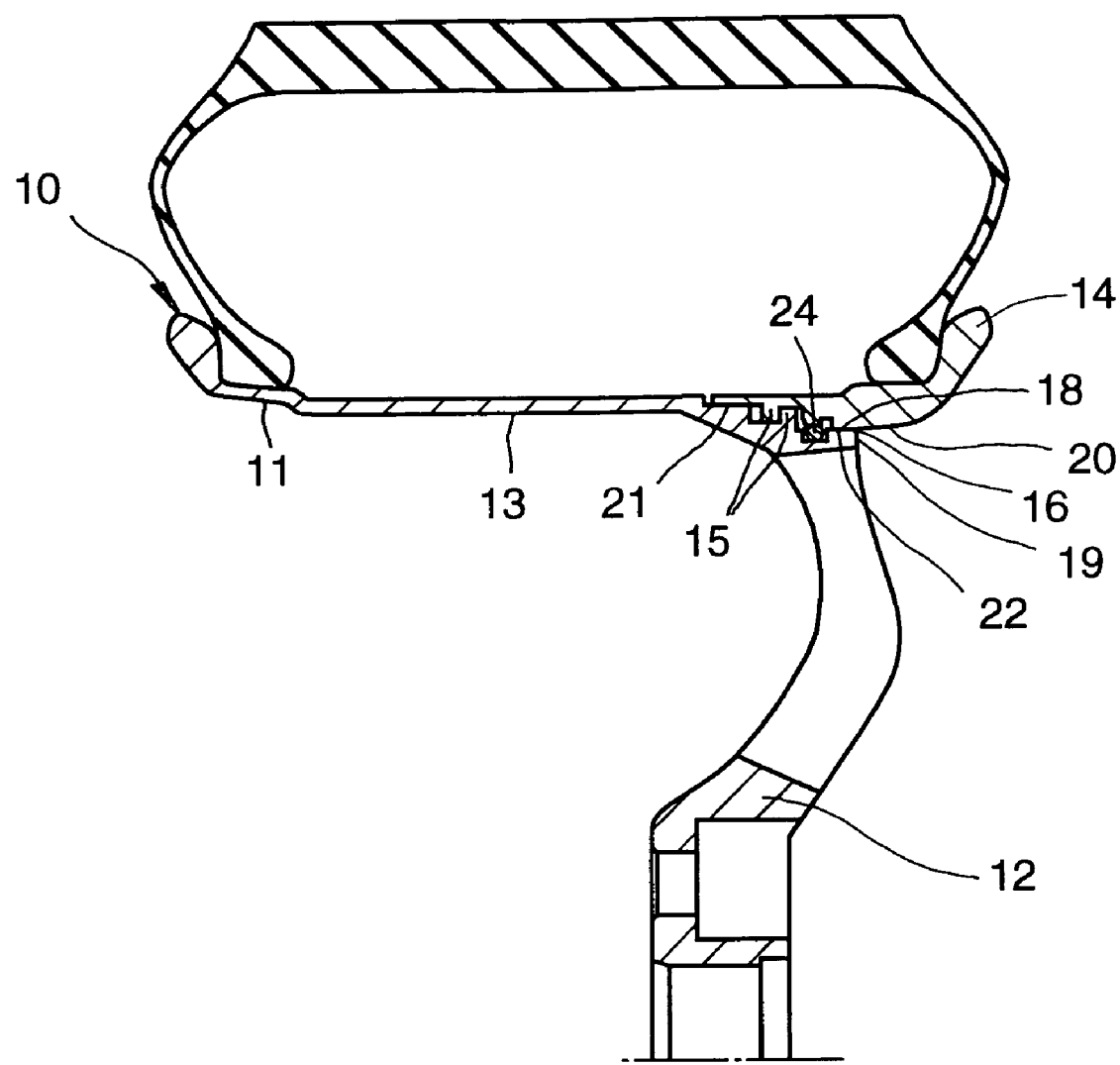
FIG. 8 is a cross-sectional view of a laterally installing wheel according to the present invention, in a case where the wheel is of type B, where the coupling portion is positioned at an axially outer portion of the rim, and where an axial end of contact surfaces of the side ring and the rim main portion is positioned at a position where a back surface of the side ring and a disk surface intersect each other at an angle.

Cases where the structure of item (ii) above is provided at an axially outer portion of the rim and is embodied in the wheel of type A are shown in FIGS. 3-6, and cases where the structure of item (ii) above is embodied in the wheel of type B are shown in FIGS. 7 and 8.

Figure 3:
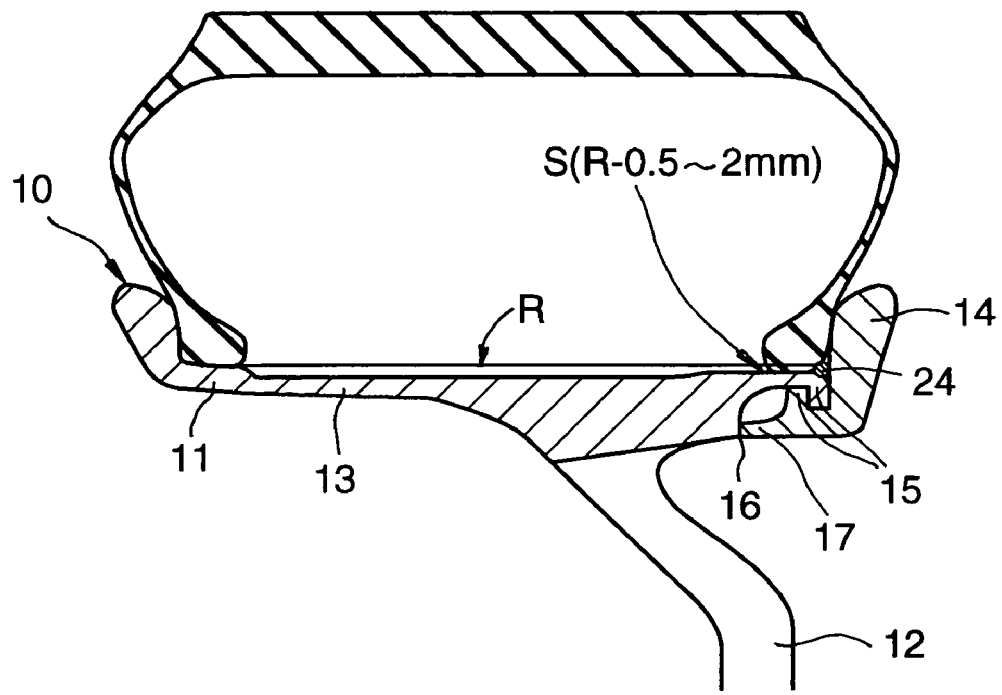
FIG. 3 is a cross-sectional view of a laterally installing wheel according to the present invention, in a case where the wheel is of type A, where the coupling portion is positioned at an axially outer portion of the rim, and where an extending portion of the side ring extending toward a disk is short and an end of the extending portion is connected to a back surface of the rim.
Figure 4:
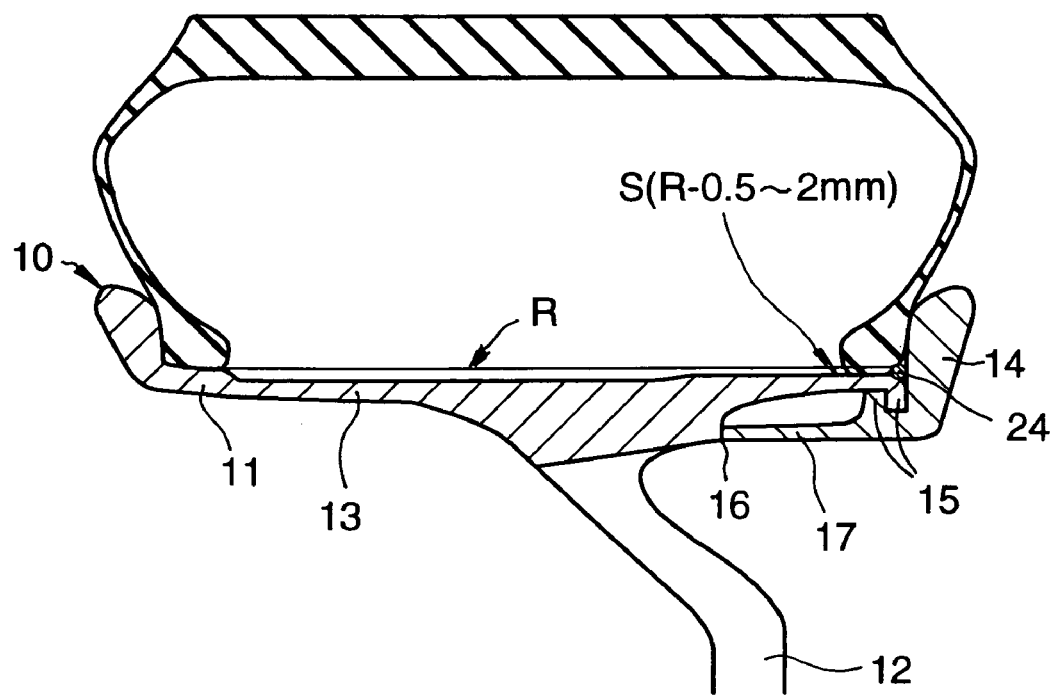
FIG. 4 is a cross-sectional view of a laterally installing wheel according to the present invention, in a case where the wheel is of type A, where the coupling portion is positioned at an axially outer portion of the rim, and where an extending portion of the side ring extending toward a disk is long and an end of the extending portion is connected to a back surface of the rim.

With FIGS. 3 and 4 of FIGS. 3-6, in the wheel of type A, in order to prevent the side ring 14 from forming a step (a step 23 is visible when viewed from axially outside the rim in a case where the step 23 is located at an axially outer portion of the rim as illustrated in FIG. 11) and a gap at a back surface of the rim (a gap 16 is conspicuous when viewed obliquely and downwardly from axially outside the rim in a case where the step is removed as illustrated in FIG. 12, resulting in formation of a slit), thereby degrading the appearance of the wheel, a radially inner portion of the side ring 14 is extended toward the disk (this extended portion will be called a disk-side extended portion 17), and an end portion of the extended portion 17 is connected smoothly to the back surface of the rim main portion by adjusting the length of the extended portion 17 so that a gap 16 is not conspicuous. A difference between the wheels of FIG. 3 and FIG. 4 is that the length of the extended portion 17 of the wheel of FIG. 4 is longer than that of the wheel of FIG. 3.

With FIGS. 5 and 6 of FIGS. 3-6, in the wheel of type A, in order to prevent the side ring 14 from forming a step at a back surface of the rim (a step 23 is visible when viewed from axially outside the rim in a case where the step 23 is located at an axially outer portion of the rim as illustrated in FIG. 11) thereby degrading the appearance of the wheel, a radially inner portion of the side ring 14 is extended toward the disk (the extended portion will be called a disk-side extended portion 17), and an end portion of the extended portion 17 is substantially butted to a surface of the disk by adjusting the length of the extended portion 17 so that a gap 16 is inconspicuous. "Substantially" means that though a clearance exists between the end of the extended portion 17 and the disk surface, the clearance is so small that when viewed, the extended portion 17 looks as if it is butted to the disk surface. A difference between the wheels of FIG. 5 and FIG. 6 is that the length of the extended portion 17 of the wheel of FIG. 6 is longer than that of the wheel of FIG. 5.

With the wheels 10 of type A of FIGS. 3-6, as illustrated in FIG. 3 and FIG. 4, preferably, a rim bead seat surface S of a 5 degree tapered surface on the side where the side ring is installed is machined from a reference line R (a rim bead seat surface on the side where the side ring is not installed) by 0.5-2 mm in radius (S=R−0.5-2 mm), whereby a tire and a run-flat core can be smoothly inserted onto the rim.

With the structures of FIG. 7 and FIG. 8, in the wheel of type B, in order that a gap will not be generated at contact surfaces 18 of the rim main portion 13 and the side ring 14 and will not degrade the external appearance when the side ring 14 is axially dislocated relative to the rim main portion 13, the contact surfaces 18 of the rim main portion 13 and the side ring 14 are directed horizontally.

Further, in order to make a clearance at the axially outer end of the contact surfaces 18 inconspicuous thereby improving the appearance, the disk surface 19 and the back surface 20 of the side ring are constructed to intersect each other at an angle, and the end of the contact surfaces 18 is positioned at the boundary between the disk surface 19 and the back surface 20 of the side ring, which have an angle between them.

With the wheel of type B, as illustrated in FIG. 7 and FIG. 8, in a case where the side ring 14 is increased in length in the axial direction whereby a moment due to a vertical load is loaded on the coupling portion 15 of the rim main portion 13 with the side ring 14 (especially, in the case of FIG. 8), in order to stably support the moment, preferably, two vertical-load supporting portions 21 and 22 are provided, there being a relatively large distance between the two supporting portions 21 and 22.

With the wheel of type B, as illustrated in FIG. 10, a groove 25 where a seal ring (O-ring) 24 is fitted is formed in the rim main portion 13, and an undercut 26 is formed in the side ring 14 where the groove 25 is not formed, so that when the side ring is rotated, the O-ring 24 does not contact the side ring. An axial clearance (an axial gap) 27 is provided between the protrusions 15b of the rim main portion 13 and the protrusions 15b of the side ring 14 so that the side ring 14 can move in the axial direction of the wheel between a first position in which the side ring 14 is rotated and a second position in which the side ring 14 is locked and sealing is obtained.

Due to this structure, during rotation of the side ring 14, the O-ring 24 fitted in the groove 25 does not contact the opposing member so that the rotational force for rotating the side ring 14 is small. During sealing, since the member having the undercut 26 therein contacts the O-ring 24, the air-sealing ability is high irrespective of the undercut 26.

As a result, in the laterally installing wheel of type B, a sealing structure where a force for rotating the side ring 14 at the time of mounting and dismounting the side ring is light maintaining the sealing ability good can be obtained.

With the present invention, the following effects and technical advantages can be obtained:

With the laterally installing wheel 10 according to the present invention, since the coupling portion 15 is constructed such that a gap 16 between the rim main portion 13 and the side ring 14 is not visible or is difficult to see from outside in the axial direction of the wheel, the appearance of the wheel is improved.

In the case where the coupling portion 15 is provided at an axially inner portion of the rim (at a right-and-left direction of the vehicle), the gap 16 between the rim main portion 13 and the side ring 14 and a step 23 at a coupling portion between the rim main portion and the side ring cannot be viewed from outside in the axial direction of the wheel, so that the appearance of the wheel is improved. Further, even when a side surface of the wheel happens to contact a boundary pavement step of a road, the coupling portion 15 positioned at the axially inner portion of the rim does not suffer or is unlikely to suffer damage.

In the case where the gap between the rim main portion 13 and the side ring 14 is provided at an inconspicuous portion of the wheel or in an inconspicuous manner, whether of type A or type B, the gap 16 is hard to view from outside in the axial direction of the wheel, so that the appearance of the wheel can be made good.

In the wheel of type A, in the case where the radial end portion of the side ring 14 is extended toward the disk 12 and is connected to the general surface of the disk by adjusting the length of the extended portion, a step 23 which can be viewed from axially outside the wheel is avoided and the gap 16 is made inconspicuous.

In the wheel of type A, in the case where the radial end portion of the side ring 14 is extended toward the disk 12 and the end of the extended portion is substantially butted to the disk surface by adjusting the length of the extended portion, a step 23 which can be viewed from the axially outside of the wheel is avoided and the gap 16 is made inconspicuous.

In the wheel of type A, in the case where the outside surface of the rim bead seat on the side of rim where the side ring is installed is machined by 0.5-2 mm in radius from an outside diameter reference line of an axially opposite rim bead seat, installing a tire and a run-flat core to the rim is easy.

In the wheel of type B, in the case where the contact surfaces 18 of the rim main portion 13 and the side ring 14 are directed horizontally, even if the rim main portion 13 and the side ring 14 are dislocated relative to each other in the axial direction of the rim, the gap 16 is inconspicuous.

In the wheel of type B, in the case where the disk surface 19 and the back surface 20 of the side ring intersect each other at an angle and an end of the contact surfaces 18 of the rim main portion and the side ring is positioned at a boundary between the disk surface and the back surface of the side ring, the gap 16 is inconspicuous.

In the wheel of type B, in the case where at the coupling portion 15 between the rim main portion 13 and the side ring 14, two vertical load support portions 21 and 22 are provided in the axial direction of the wheel, a moment loaded on the side ring 14 can be stably supported.

In the wheel of type B, in the case where in one of the rim main portion 13 and the side ring 14, a seal ring groove 25 for fitting a seal ring (O-ring) 24 therein is formed, and in the other of the rim main portion 13 and the side ring 14, an undercut 26 is formed so that at a position where the side ring 14 is rotated the seal ring 24 does not contact the other of the rim main portion and the side ring, a force for rotating the side ring 14 about an axis of the wheel can be small, while good sealing ability is maintained.

INDUSTRIAL APPLICABILITY

The laterally installing wheel 10 according to the present invention can be utilized for improving the external appearance of the laterally installing wheel, in a case in which at least one of rim flanges is separate from the rim main portion.

The invention claimed is:

1. A wheel which is adapted to laterally receive a tire, including a rim where a rim main portion and a side ring are disconnectably coupled to each other at a coupling portion of the rim main portion and the side ring, the rim having a rim bead seat at each of axially opposite portions of the rim, each rim bead seat having an outside surface, the rim main portion and the side ring defining a gap therebetween, wherein the coupling portion is constructed such that the gap between the rim main portion and the side ring is inconspicuous from outside in an axial direction of the wheel, wherein the wheel comprises a tire bead on the side contacting the side ring is installed onto the rim main portion, and wherein the outside surface of the rim bead seat on a side of rim where the side ring is installed is machined by 0.5-2 mm in radius from an outside diameter reference line of the axially opposite rim bead set.

2. A wheel according to claim 1, further comprising a disk, wherein the side ring has a radially inner portion having an end and the rim main portion has a back surface, and wherein the radially inner portion of the side ring is extended toward the disk and has a length such that the end of the radially inner portion is connected to a the back surface of the rim main portion.

3. A wheel according to claim 1, further comprising a disk having a surface, wherein the side ring has a radially inner portion having an end, and wherein the radially inner portion of the side ring is extended toward the disk and has a length such that the end of the radially inner portion is buffed to the surface of the disk.

4. A wheel including a rim where a rim main portion and a side ring are disconnectably coupled to each other at a coupling portion of the rim main portion and the side ring, the rim main portion and the side ring defining a gap therebetween, wherein the rim main portion and the side ring each comprise grooves and protrusions at the coupling portion, the grooves of the rim main portion and the protrusions of the side ring being configured to engage each other in the axial direction of the rim, causing the side ring to be inserted into the rim main portion and then rotated, so that the side ring is prevented from being removed from the rim main portion, wherein the coupling portion is constructed such that a the gap between the rim main portion and the side ring is inconspicuous from outside in an axial direction of the wheel, wherein the wheel comprises a tire bead on a side of contacting the side ring is installed onto the side ring, and wherein in the rim main portion, a seal ring groove for fitting a seal ring therein is formed, and in the side ring, an undercut is formed so that at a position in which the side ring is moved axially inboard so as to be rotated the seal ring is inhibited from contacting the side ring.

5. A wheel according to claim 4, wherein contact surfaces of the rim main portion and the side ring are directed in a horizontal direction.

6. A wheel according to claim 5, wherein the surface of a disk and a back surface of the side ring intersect each other at an angle and the end of the contact surfaces of the rim main portion and the side ring is positioned at the surface of the disk and the back surface of the side ring.

7. A wheel according to claim 4, wherein at a coupling portion between the rim main portion and the side ring, two vertical load support portions are provided in an axial direction of the wheel.

* * * * *